United States Patent
Chou et al.

(10) Patent No.: US 10,135,280 B2
(45) Date of Patent: Nov. 20, 2018

(54) CHARGING CIRCUIT AND ELECTRONIC DEVICE

(71) Applicant: Wistron Corporation, New Taipei (TW)

(72) Inventors: Ying-Tzu Chou, New Taipei (TW); Chih-Nan Peng, New Taipei (TW); Yan-Cheng Pan, New Taipei (TW)

(73) Assignee: Wistron Corporation, New Taipei (TW)

( * ) Notice: Subject to any disclaimer, the term of this patent is extended or adjusted under 35 U.S.C. 154(b) by 61 days.

(21) Appl. No.: 15/408,437

(22) Filed: Jan. 18, 2017

(65) Prior Publication Data

US 2018/0041064 A1     Feb. 8, 2018

(30) Foreign Application Priority Data

Aug. 5, 2016   (TW) .............................. 105124913 A

(51) Int. Cl.
| | |
|---|---|
| *H02J 7/06* | (2006.01) |
| *H02J 7/24* | (2006.01) |
| *H02J 7/00* | (2006.01) |
| *H02J 7/34* | (2006.01) |

(52) U.S. Cl.
CPC .......... *H02J 7/0081* (2013.01); *H02J 7/0045* (2013.01); *H02J 7/0068* (2013.01); *H02J 7/345* (2013.01)

(58) Field of Classification Search
CPC ........ H02J 7/008; H02J 7/0072; H02J 7/0031; H02J 7/0068; H02J 7/022
USPC .......................................................... 320/164
See application file for complete search history.

(56) References Cited

U.S. PATENT DOCUMENTS

| | | | | |
|---|---|---|---|---|
| 5,818,199 | A  * | 10/1998 | Beard ................... | H01M 10/44 320/116 |
| 2007/0188134 | A1* | 8/2007 | Hussain ................ | H01M 10/44 320/114 |
| 2007/0210758 | A1* | 9/2007 | Gangstoe .............. | H02J 7/0031 320/134 |
| 2008/0106232 | A1* | 5/2008 | Idzik ..................... | H01M 10/44 320/103 |
| 2015/0091385 | A1* | 4/2015 | Manian ................ | H04B 5/0037 307/104 |

FOREIGN PATENT DOCUMENTS

CN             201315048 Y       9/2009

* cited by examiner

*Primary Examiner* — Arun C Williams
(74) *Attorney, Agent, or Firm* — Winston Hsu

(57) ABSTRACT

A charging circuit for providing a charge current sent to a battery is disclosed. The charging circuit includes a linear regulator for converting a power voltage into a first indication voltage; a voltage divider circuit for generating a frequency response to convert the first indication voltage into a second indication voltage; and a charger for providing the charge current sent to the battery when the second indication voltage is within a sensible range, wherein the power voltage is within a broad voltage range, and the first indication voltage is fixed.

12 Claims, 4 Drawing Sheets

CHARGING CIRCUIT AND ELECTRONIC DEVICE

BACKGROUND OF THE INVENTION

1. Field of the Invention

The present invention is related to a charging circuit and electronic device, and more particularly, to a charging circuit and electronic device processing broad range input power by a linear regulator.

2. Description of the Prior Art

In comparison with consumer tablets, rugged tablets have to be applied to various application scenarios, and for that reason rugged tablets are designed with more concerns. For example, an input power voltage of the consumer tablet is a constant, and can be converted into a fixed charging voltage by a resistive voltage divider. As such, the fixed charging voltage can be detected by the consumer tablet. In comparison, when the rugged tablet (such as a military tablet) is used on a car, the rugged tablet is charged by a car battery. However, the car battery has various specifications, and may provide a power voltage ranging from 10.8 to 19 volts. Such a diverse power voltage cannot be converted into a fixed charging voltage by a simple resistive voltage divider.

In order to processing the power voltage ranging from 10.8 to 19 volts, a charging chip supporting a broad voltage range input is installed in the rugged tablet to provide the required charging voltage and charging current sent to a battery of the rugged tablet. However, the charging chip supporting the broad voltage range input is expensive and difficult to be acquired. Therefore, the rugged tablet has to be charged in an improved way for cost reduction.

SUMMARY OF THE INVENTION

It is therefore an objective of the present invention to provide a charging circuit and electronic device capable of processing a broad voltage range input without employing the charging chip supporting the broad voltage range input.

The present invention discloses a charging circuit, for providing a charge current sent to a battery, the charging circuit comprising a linear regulator, for converting a power voltage into a first indication voltage; a voltage divider circuit, electrically coupled to the linear regulator, for generating a frequency response to convert the first indication voltage into a second indication voltage; and a charger, electrically coupled to the voltage divider circuit, for providing the charge current sent to the battery when the second indication voltage is within a sensible range; wherein the power voltage is within a broad voltage range, and the first indication voltage is fixed.

The present invention further discloses an electronic device, comprising a functional module, for performing a function of the electronic device; a battery, electrically coupled to the functional module, for providing electrical power required by the functional module; and a charging circuit, comprising a linear regulator, for converting a power voltage into a first indication voltage; a voltage divider circuit, electrically coupled to the linear regulator, for generating a frequency response to convert the first indication voltage into a second indication voltage; and a charger, electrically coupled to the voltage divider circuit, for providing a charge current sent to the battery when the second indication voltage is within a sensible range; wherein the power voltage is within a broad voltage range, and the first indication voltage is fixed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
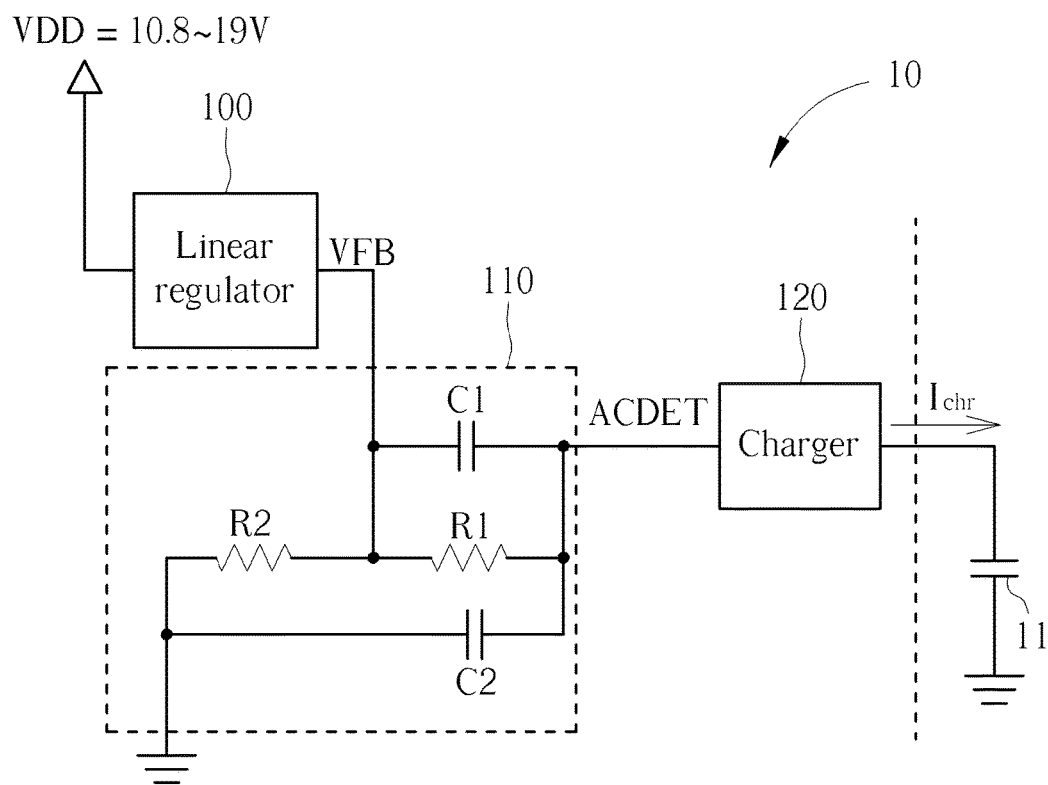
FIG. 1 is a schematic diagram of a charging circuit according to an embodiment of the present invention.

Please refer to FIG. 1, which is a schematic diagram of a charging circuit 10 according to an embodiment of the present invention. The charging circuit 10 is utilized for providing a charge current Ichr sent to a battery 11. The charging circuit 10 includes a linear regulator 100, a voltage divider circuit 110 and a charger 120. The linear regulator 100 is utilized for converting a power voltage VDD into a first indication voltage VFB. The power voltage VDD is within a broad voltage range, e.g. 10.8-19 volts. In comparison, the first indication voltage VFB is fixed. The voltage divider circuit 110 is utilized for generating a frequency response to convert the first indication voltage VFB into a second indication voltage ACDET, e.g. 2.7 volts. When the second indication voltage ACDET is within a sensible range (e.g. 2.4-3.15 volts) of the charger 120, the charger 120 provides the charge current Ichr sent to the battery 11.

Since the charging chip supporting the broad voltage range input is expensive, the linear regulator 100 (e.g. chip PU4407) is first employed to convert the varying power voltage VDD into the fixed first indication voltage VFB, and then the voltage divider circuit 110 is employed to convert the first indication voltage VFB into the second indication voltage ACDET which can be sensed by the charger 120. As a result, the charger 120 no longer has to be implemented with the charging chip supporting the broad voltage range input, and can be implemented by a common charging chip, so as to reduce cost of the charging circuit 10. For example, the charging chip supports the broad voltage range input (from 10.8 to 19 volts), and the charger 120 merely has to support an input voltage range from 2.4 to 3.15 volts, implying a much lower specification. Therefore, the charger 120 can be implemented by a cheaper solution, such as the charging chip PU4404.

Specifically, the charging circuit 10 includes capacitors C1, C2 and resistors R1, R2 which are connected according to FIG. 1, and can provide the frequency response to convert the first indication voltage VFB into the second indication voltage ACDET sensible for the charger 120.

Note that, in order to more flexibly control the charging circuit 10, an activation signal EN can be employed to enable or disable the linear regulator 100. That is, only when the activation signal EN with a high potential is received, the linear regulator 100 converts the power voltage VDD into the first indication voltage VFB.

Figure 2:
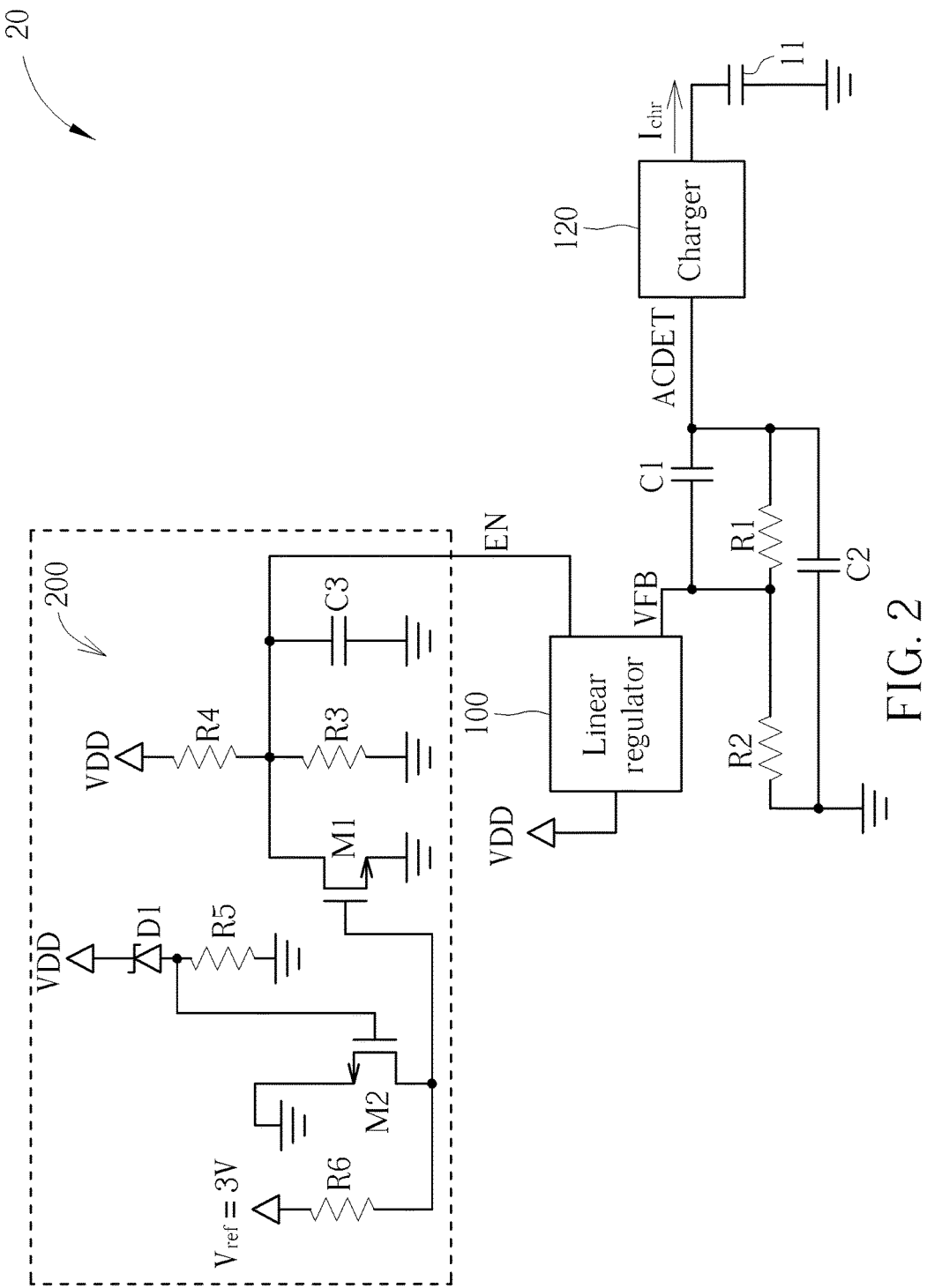
FIG. 2 is a schematic diagram of a charging circuit according to an embodiment of the present invention.
Figure 3:
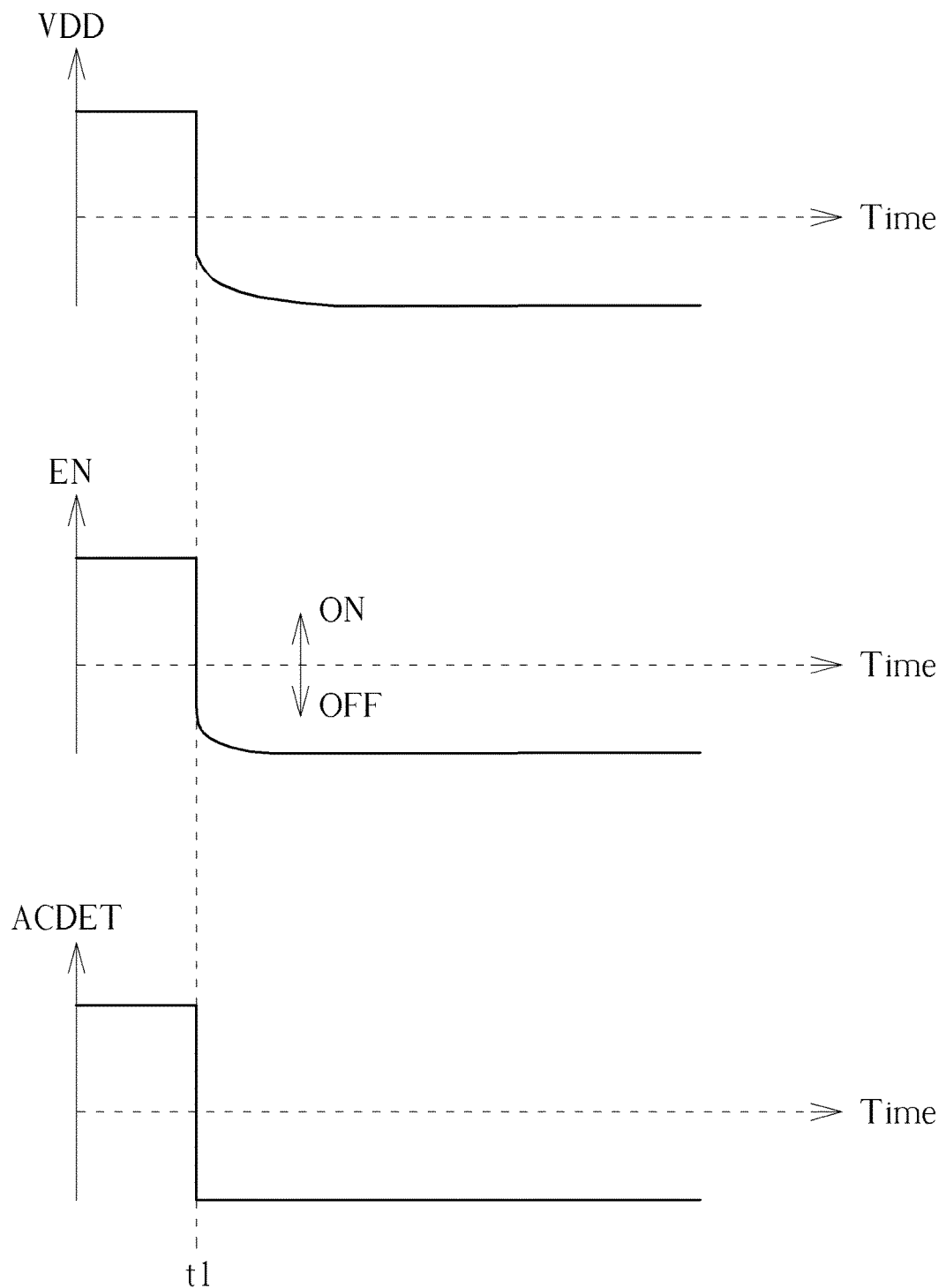
FIG. 3 is a time-varying diagram of signals of the charging circuit of FIG. 2.

More specifically, please refer to FIG. 2, which is a schematic diagram of a charging circuit 20 according to an embodiment of the present invention. Since the charging circuit 20 is derived from the charging circuit 10, identical components are labeled by the same numerical notations. In comparison with the charging circuit 10, the charging circuit 20 further includes an indication circuit 200. The indication circuit 200 includes a capacitor C3, resistors R3, R4, R5, R6, transistors M1, M2 and a Zener diode D1, which are connected according to FIG. 2, and can disable (e.g. switch into a low potential) the activation signal EN when the power voltage VDD is disabled (e.g. a plug is pull off). In short, since the Zener diode D1 can generate a voltage drop (e.g. 3.6 volts), the indication circuit 200 can immediately provide a discharging path for the activation signal EN when the power voltage VDD (10.8-19 volts) is removed if a reference voltage Vref is properly designed, such as 3 volts. As a result, the activation signal EN is immediately switched to the low potential, as shown in FIG. 3. According to FIG. 3, the power voltage VDD is removed at a time instance t1, and the activation signal EN is simultaneously switched into the low potential, so as to disable the linear regulator 100. Once the linear regulator 100 is switched off, the second indication voltage ACDET is immediately pull down to a low potential, implying that the charger 120 stops to provide the charge current Ichr sent to the battery 11, so as to avoid an erroneous charging operation on the charger 120.

Figure 4:
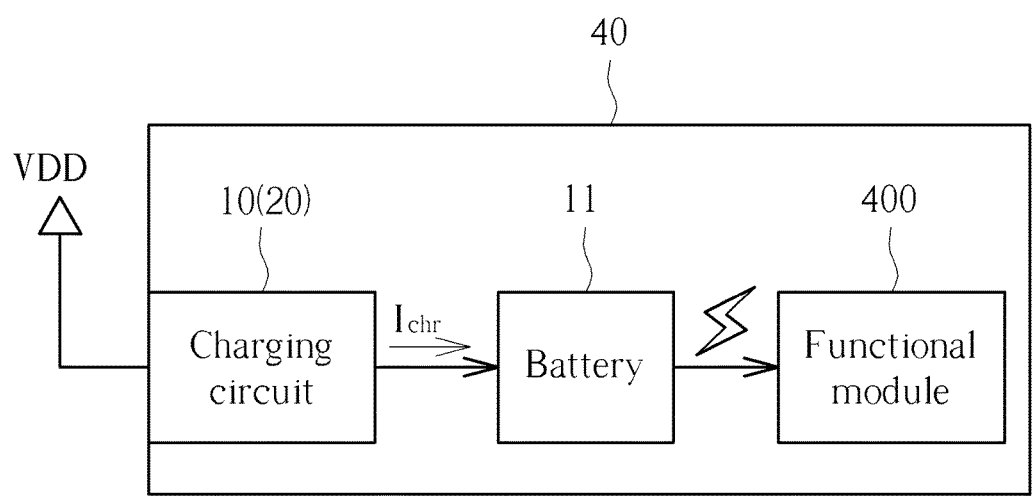
FIG. 4 is a schematic diagram of an electronic device according to an embodiment of the present invention.

In practice, the charging circuits 10, 20 can be implemented as independent circuits or integrated within an electronic device (such as a rugged tablet). For example, please refer to FIG. 4, which is a schematic diagram of an electronic device 40 according to an embodiment of the present invention. The electronic device 40 includes the charging circuit 10 (or 20), the battery 11 and a functional module 400. The functional module 400 is utilized for performing a function of the electronic device 40, such as a function of a tablet. The battery 11 is utilized for providing electrical power required by the functional module 400. As a result, even if the power voltage VDD varies with application scenarios, the charging circuit 10 (or 20) still can correctly charge the battery 11 to ensure that the functional module 400 correctly operates.

To sum up, in order to replace the expensive charging chip supporting the broad voltage range input, the linear regulator is first employed to convert the broad voltage range input into the fixed first indication voltage, and then the voltage divider circuit is employed to convert the first indication voltage into the second indication voltage sensible for the charger, so as to instruct the charger to generate the charge current. Therefore, according to the present invention, a cheaper solution, e.g. a common charger, can be employed to achieve the same function of receiving the broad voltage range input for reducing cost of the rugged tablet.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A charging circuit, for providing a charge current sent to a battery, the charging circuit comprising:
   a linear regulator, for converting a power voltage into a first indication voltage;
   a voltage divider circuit, electrically coupled to the linear regulator, for generating a frequency response to convert the first indication voltage into a second indication voltage; and
   a charger, electrically coupled to the voltage divider circuit, for providing the charge current sent to the battery when the second indication voltage is within a sensible range;
   wherein the power voltage is within a broad voltage range, and the first indication voltage is fixed;
   wherein the voltage divider circuit comprises:
   a first capacitor, comprising:
      a first end, electrically coupled to the linear regulator, for receiving the first indication voltage; and
      a second end, electrically coupled to the charger, for outputting the second indication voltage;
   a first resistor, comprising:
      a first end, electrically coupled to the first end of the first capacitor; and
      a second end, electrically coupled to the second end of the first capacitor;
   a second resistor, electrically coupled between the first end of the first capacitor and a ground; and
   a second capacitor, electrically coupled between the second end of the first capacitor and the ground.

2. The charging circuit of claim 1, wherein the broad voltage range is 10.8-19 volts, and the sensible range is 2.4-3.15 volts.

3. The charging circuit of claim 1, wherein the linear regulator converts the power voltage into the first indication voltage when receiving an activation signal.

4. The charging circuit of claim 3 further comprising an indication circuit, electrically coupled to the linear regulator, for disabling the activation signal when the power voltage is disabled.

5. The charging circuit of claim 4, wherein the indication circuit comprises:
   a third capacitor, comprising:
      a first end, electrically coupled to the linear regulator, for outputting the activation signal; and
      a second end, electrically coupled to a ground;
   a third resistor, electrically coupled between the first end of the third capacitor and the ground;
   a fourth resistor, electrically coupled between the first end of the third capacitor and the power voltage;
   a first transistor, comprising:
      a source end, electrically coupled to the ground;
      a drain end, electrically coupled to the first end of the third capacitor; and
      a gate end;
   a Zener diode, comprising:
      a cathode, electrically coupled to the power voltage; and
      an anode;
   a fifth resistor, electrically coupled between the anode and the ground;
   a sixth resistor, electrically coupled between a reference voltage and the gate end of the first transistor; and
   a second transistor, comprising:
      a source end, electrically coupled to the ground;
      a drain end, electrically coupled to the gate end of the first transistor; and
      a gate end, electrically coupled to the anode.

6. The charging circuit of claim 5, wherein the reference voltage is three volts.

7. An electronic device, comprising:
a functional module, for performing a function of the electronic device;
a battery, electrically coupled to the functional module, for providing electrical power required by the functional module; and
a charging circuit, comprising:
a linear regulator, for converting a power voltage into a first indication voltage;
a voltage divider circuit, electrically coupled to the linear regulator, for generating a frequency response to convert the first indication voltage into a second indication voltage; and
a charger, electrically coupled to the voltage divider circuit, for providing a charge current sent to the battery when the second indication voltage is within a sensible range;
wherein the power voltage is within a broad voltage range, and the first indication voltage is fixed;
wherein the voltage divider circuit comprises:
a first capacitor, comprising:
a first end, electrically coupled to the linear regulator, for receiving the first indication voltage; and
a second end, electrically coupled to the charger, for outputting the second indication voltage;
a first resistor, comprising:
a first end, electrically coupled to the first end of the first capacitor; and
a second end, electrically coupled to the second end of the first capacitor;
a second resistor, electrically coupled between the first end of the first capacitor and a ground; and
a second capacitor, electrically coupled between the second end of the first capacitor and the ground.

8. The electronic device of claim 7, wherein the broad voltage range is 10.8-19 volts, and the sensible range is 2.4-3.15 volts.

9. The electronic device of claim 7, wherein the linear regulator converts the power voltage into the first indication voltage when receiving an activation signal.

10. The electronic device of claim 9 further comprising an indication circuit, electrically coupled to the linear regulator, for disabling the activation signal when the power voltage is disabled.

11. The electronic device of claim 10, wherein the indication circuit comprises:
a third capacitor, comprising:
a first end, electrically coupled to the linear regulator, for outputting the activation signal; and
a second end, electrically coupled to a ground;
a third resistor, electrically coupled between the first end of the third capacitor and the ground;
a fourth resistor, electrically coupled between the first end of the third capacitor and the power voltage;
a first transistor, comprising:
a source end, electrically coupled to the ground;
a drain end, electrically coupled to the first end of the third capacitor; and
a gate end;
a Zener diode, comprising:
a cathode, electrically coupled to the power voltage; and
an anode;
a fifth resistor, electrically coupled between the anode and the ground;
a sixth resistor, electrically coupled between a reference voltage and the gate end of the first transistor; and
a second transistor, comprising:
a source end, electrically coupled to the ground;
a drain end, electrically coupled to the gate end of the first transistor; and
a gate end, electrically coupled to the anode.

12. The electronic device of claim 11, wherein the reference voltage is three volts.

* * * * *